US008941261B2

(12) United States Patent
Shaffer (10) Patent No.: US 8,941,261 B2
(45) Date of Patent: Jan. 27, 2015

(54) SYSTEM AND METHOD FOR PROVIDING COLLABORATING POWER CONTROLLERS (75) Inventor: Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 12/710,284

(22) Filed: Feb. 22, 2010

(65) Prior Publication Data
US 2011/0204717 A1   Aug. 25, 2011

(51) Int. Cl.
H02J 1/10 (2006.01)
H02J 3/18 (2006.01)
G06Q 40/04 (2012.01)
G07F 15/00 (2006.01)
H02J 3/00 (2006.01)
H02J 3/38 (2006.01)

(52) U.S. Cl.
CPC . H02J 3/18 (2013.01); G06Q 40/04 (2013.01); G07F 15/008 (2013.01); H02J 3/008 (2013.01); H02J 3/382 (2013.01); Y02E 40/30 (2013.01); Y04S 50/10 (2013.01); H02J 3/383 (2013.01); H02J 3/386 (2013.01); Y02E 10/563 (2013.01); Y02E 10/763 (2013.01)
USPC .............................................. 307/18; 705/34

(58) Field of Classification Search
USPC .............................................. 307/18; 705/34
See application file for complete search history.

(56) References Cited

U.S. PATENT DOCUMENTS 5,224,099 A    6/1993  Corbalis et al.
5,311,418 A *  5/1994  Lalander ........................ 363/27
5,390,068 A *  2/1995  Schultz et al. ................ 361/95
6,212,164 B1   4/2001  Murakami et al.
6,501,628 B1* 12/2002  Namba et al. .................... 361/5
6,859,435 B1   2/2005  Lee et al.
6,906,434 B1*  6/2005  Koeppe et al. .................. 307/64
7,013,347 B1   3/2006  Moen
7,508,173 B2*  3/2009  Zhou et al. .................... 323/207
7,564,789 B2   7/2009  Betker
7,953,088 B2   5/2011  Cheriton et al.
7,965,681 B2   6/2011  Berglund et al.
2002/0087234 A1* 7/2002  Lof et al. ....................... 700/286

(Continued)

OTHER PUBLICATIONS

U.S. Appl. No. 12/968,123, filed Dec. 14, 2010, entitled "System and Method for Optimizing Packet Routing in a Mesh Network," Inventors: Shmuel Shaffer, et al.

(Continued)

Primary Examiner — Rexford Barnie
Assistant Examiner — Joseph Inge
(74) Attorney, Agent, or Firm — Patent Capital Group (57) ABSTRACT A method is provided in one example embodiment and includes receiving a message associated with a detection of reactive power in an energy system and inducing a first quantity of reactive power at a power level specified in the message. The first quantity of reactive power is induced in order to mitigate a second quantity of reactive power that is detected on a specific segment of the energy system. The first quantity of reactive power is induced at a local level on which a source associated with the second quantity of reactive power operates. In more specific embodiments, the message is sent in response to a sensor detecting the second quantity of reactive power, where the first quantity and the second quantity of reactive power are the same. In other embodiments, the method can include receiving a second message to stop mitigating the first quantity of reactive power.

20 Claims, 4 Drawing Sheets

(56) References Cited

U.S. PATENT DOCUMENTS

| | | | |
|---|---|---|---|
| 2002/0105231 A1* | 8/2002 | Koeppe et al. | 307/64 |
| 2004/0167677 A1* | 8/2004 | Weiss | 700/291 |
| 2005/0174942 A1 | 8/2005 | Betker | |
| 2006/0045011 A1 | 3/2006 | Aghvami et al. | |
| 2007/0002740 A1 | 1/2007 | Evans et al. | |
| 2007/0201365 A1 | 8/2007 | Skoog et al. | |
| 2008/0085702 A1 | 4/2008 | Park et al. | |
| 2008/0177678 A1* | 7/2008 | Di Martini et al. | 705/412 |
| 2010/0205281 A1 | 8/2010 | Porter et al. | |
| 2010/0317317 A1 | 12/2010 | Maier et al. | |

OTHER PUBLICATIONS

U.S. Appl. No. 12/968,163, filed Dec. 14, 2010, entitled "System and Method for Providing Configuration Data in a Mesh Network," Inventors: Shmuel Shaffer, et al.

Cisco, "Bringing the SmartGrid into the Home: The Value of Home Energy Management for Utilities," Whitepaper, ©2010, 6 pages.

J. Sangiamwong and T. Sugiyama, "Hidden Node Problem Aware Routing Metric for Wireless LAN Mesh Networks," 18$^{th}$ Annual IEEE International Symposium on Personal, Indoor and Mobile Radio Communications (PIMRC'07), ©2007 IEEE, 5 pages.

Meshdynamics, Inc., "Meshdynamics Network Viewer User Guide," Network Viewer Release 9.0, ©2008, 57 pages; www.meshdynamics.com.

Wikipedia, the free encyclopedia, "AC Power," 4 pages; printed from http://en.wikipedia.org/wiki/AC_power#Real.2C_reactive.2C_and_apparent_power on Feb. 22, 2010.

American Superconductor, "Dynamic Reactive Power Compensation," 2 pages; ©2004; printed from http://www.amsc.com/documents/PES_SVR_01_0804a.pdf on Feb. 22, 2010.

S&C Electric Company, "What is VAR Management?" 2 pages; Apr. 15, 2002; printed from http://www.sandc.com/webzine/2002/041502_1.asp on Feb. 22, 2010.

Nokian Capacitors, Ltd., "DW-series detuned filter capacitor bank," 2 pages; EN-LV14-May 2007; www.areva-td.com.

Wikipedia, the free encyclopedia, "Power Factor," 9 pages; printed from http://en.wikipedia.org/wiki/Power_factor on Feb. 22, 2010.

Digital Phase Converters—Phase Converter Information; 2 pages; printed from http://www.phaseconverterinfo.com/phaseconverter_digital.htm on Feb. 22, 2010.

USPTO Jan. 4, 2013 Non-Final Office Action from U.S. Appl. No. 12/968,163.

USPTO Aug. 2, 2013 Response to May 2, 2013 Non-Final Office Action from U.S. Appl. No. 12/968,123.

USPTO Sep. 20, 2009 Notice of Allowance from U.S. Appl. No. 12/968,123.

USPTO Sep. 17, 2013 RCE Response to Jun. 27, 2013 Final Office Action from U.S. Appl. No. 12/968,163.

USPTO May 2, 2013 Non-Final Office Action from U.S. Appl. No. 12/968,123.

USPTO Jun. 27, 2013 Final Office Action from U.S. Appl. No. 12/968,163.

USPTO Apr. 1, 2013 Response to Non-Final Office Action dated Jan. 4, 2013 from U.S. Appl. No. 12/968,163.

USPTO Jul. 22, 2014 Non-Final Office Action from U.S. Appl. No. 12/968,163.

* cited by examiner

SYSTEM AND METHOD FOR PROVIDING COLLABORATING POWER CONTROLLERS

TECHNICAL FIELD

This disclosure relates in general to the field of power management and, more particularly, to providing collaborating power controllers.

BACKGROUND

Energy consumption has become increasingly important in today's society. An electrical grid represents an interconnected power network, which can be used to deliver electricity to consumers. Activities for the electric grid can involve electricity generation, electric power transmission, and electricity distribution. A transmission network has the ability to move power across distances until it reaches its intended customer, which may be a company that owns a local distribution network. After arrival at a substation, power can be stepped down in voltage (from a transmission level voltage to a distribution level voltage). The power can then exit the substation and subsequently enter into distribution pathways. Thereafter, power can be delivered to a service location, where the power is stepped down again from the distribution voltage to the required service voltages.

Ideally, all of these activities are conducted in an efficient manner. However, in practical terms, energy waste occurs due to the prevalence of reactive power. The challenge lies in successfully coordinating these power management activities in a manner that minimizes/eliminates potential inefficiencies. Thus, the ability to properly manage energy resources provides a significant challenge to electric grid operators, component manufacturers, service providers, and power system administrators alike.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a message associated with a detection of reactive power in an energy system and inducing a first quantity of reactive power at a power level specified in the message. The first quantity of reactive power is induced in order to mitigate a second quantity of reactive power that is detected on a specific segment of the energy system. The first quantity of reactive power is induced at a local level on which a source associated with the second quantity of reactive power operates. In more specific embodiments, the message is sent in response to a sensor of the energy system detecting the second quantity of reactive power, where the first quantity of reactive power and the second quantity of reactive power are the same.

In other embodiments, the method can include receiving a second message to stop mitigating the first quantity of reactive power. The second message is sent in response to detecting that the second quantity of reactive power is no longer present on the specific segment of the energy system. The method can also include providing a financial benefit to an owner associated with activities inducing the first quantity of reactive power, the financial benefit can be provided in response to complying with the message to induce the first quantity of reactive power. The first quantity of reactive power can compensate for the second quantity of reactive power on the specific segment of the energy system to bring an associated power factor closer to one. The message can include a specific time interval in which the first quantity of reactive power is consumed. The message can also include a specific polarity associated with the first quantity of reactive power to be consumed.

Example Embodiments

Figure 1:
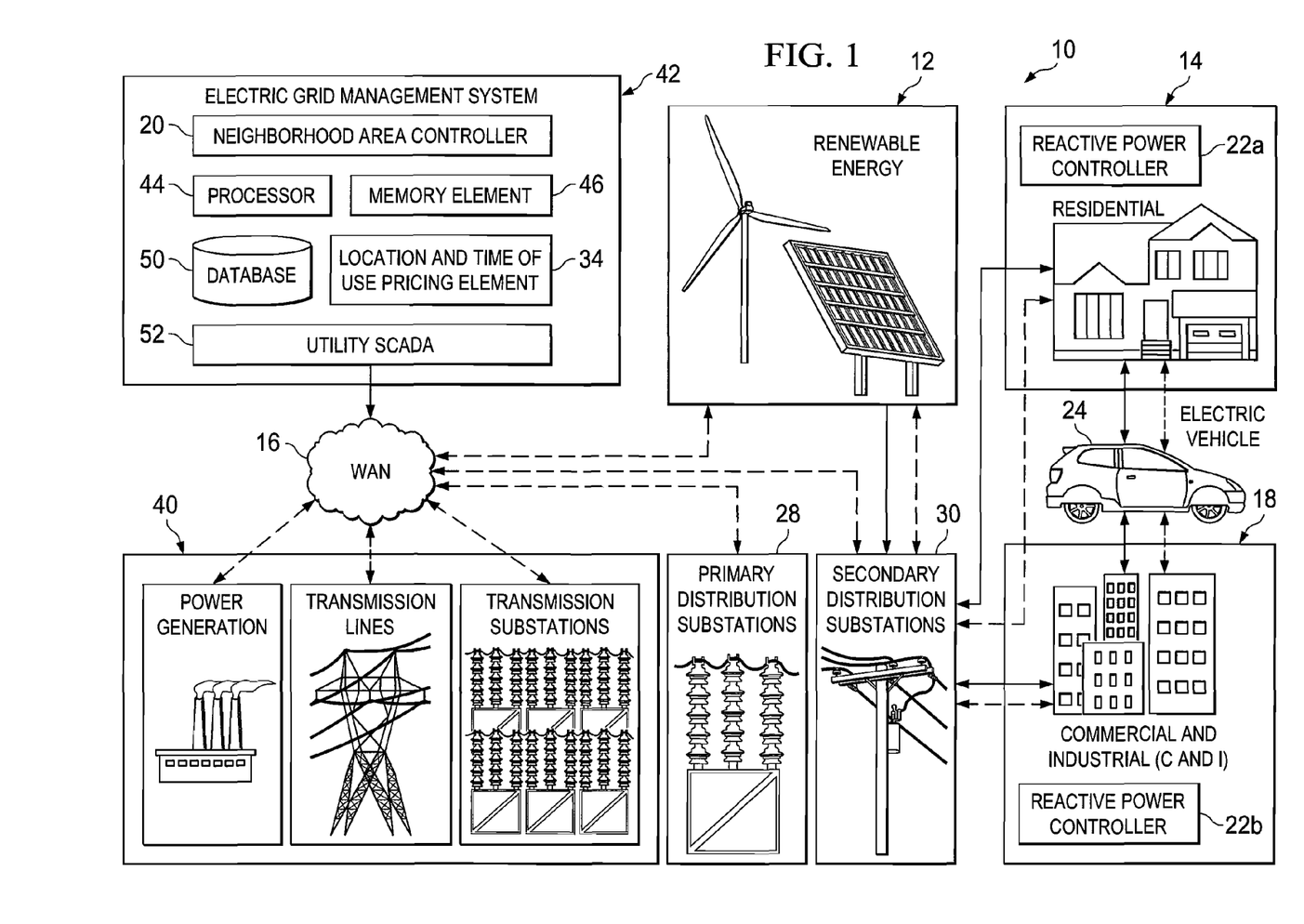
FIG. 1 is a simplified block diagram of a system for providing collaborating power controllers in accordance with one example embodiment of the present disclosure.

Turning to FIG. 1, FIG. 1 is a simplified block diagram of a system 10 for providing collaborating power controllers in accordance with one embodiment of the present disclosure. System 10 can include multiple residential consumers 14, along with multiple commercial and industrial consumers 18. In one example implementation, residential consumers 14 and commercial and industrial consumers 18 include respective reactive power controllers 22a-b. As an example of an object that may consume/receive power, an electric car 24 is also illustrated in FIG. 1, where electric car 24 can be used (and systematically charged) by components associated with residential or commercial entities. FIG. 1 also includes a renewable energy source 12, which may include items such as windmills, solar panels, geothermal mechanisms, biofuels, hydroelectricity, or any other suitable energy supply. Also provided in FIG. 1 is a wide area network (WAN) 16, which can connect an electric grid 40 to an electric grid management system 42.

Electric grid 40 may include power generation mechanisms, transmission lines, transmission substations, etc. that can coordinate/manage power generation and power distribution for system 10. Electric grid management system 42 may include a neighborhood area controller 20, a location and time of use [ToU] pricing element 34, a processor 44, a memory element 46, a database 50, and a utility supervisory control and data acquisition (SCADA) element 52. WAN 16 may further connect primary distribution substations 28 and secondary distribution substations 30 to various infrastructure of FIG. 1.

Certain elements of FIG. 1 may couple to one another through power interfaces, transmission lines, or through any other suitable connection that provides a viable pathway for power or for communications. Additionally, any one or more of the elements of FIG. 1 may be combined or removed from the architecture based on particular power configuration needs. Additionally, certain components of system 10 may include a configuration capable of transmission control protocol/internet protocol (TCP/IP) communications for the transmission or reception of packets in a network. System 10 may also operate in conjunction with a user datagram protocol/IP (UDP/IP) or any other suitable protocol or tunneling technique, where appropriate and based on particular needs. Legacy non-IP protocols over separate wires, over power lines (over wireless components, etc.) may be similarly utilized.

For purposes of illustrating certain example techniques of system 10, it is important to understand the activities that frequently occur, as power propagates over transmission lines and is ultimately distributed to various consumer endpoints. The following foundational information may be viewed as a basis from which the present disclosure may be properly explained. Typically, a distribution substation receives its power from a transmission network, which delivers power from an energy source such as a generating station. Electric grid management system 42 can help coordinate these activities and, further, respond to power needs across its service area. Transmission lines, when interconnected with each other, can become high-voltage transmission networks. The power from the transmission network can be stepped down with a transformer and then sent to a bus, where feeders are used to send power in all directions across the electric grid coverage area. Three-phase power is commonly carried over the transmission lines to its intended next destination. When power is consumed, a certain voltage is provided, where an impedance is being presented to the utility network. Depending on the impedance being presented, the phase of the current being drawn will either be leading ahead of or lagging behind the voltage.

There are three basic types of power. First, apparent power is the product of root mean square (rms) volts and rms amperes (amps). Most electrical equipment is rated in apparent power, which is the combination of real power and reactive power. Second, real power is the power that performs real work (i.e., the time average of the instantaneous product of voltage and current, which are at the same phase). Third, reactive power exists in the electrical distribution and transmission system due to the inherent capacitive and inductive elements in a power system. Reactive power performs no real work and is often associated with power that is converted to magnetic fields. In more technical terms, reactive power is the time average of the instantaneous product of the voltage and current, with a current phase shifted 90 degrees.

The angle theta represents the phase angle between real power and apparent power. The size of that angle (in degrees) determines the size of the reactive power. When theta is equal to zero (0), the cosine of theta is equal to one (1), the sine is equal to zero (0), and apparent power and real power are on the same plane. More importantly, there is no reactive power in this scenario and, further, this results in a unity power factor (i.e., a power factor of 1). The unity power factor situation indicates that all the electrical energy is being transferred into real power (or real work) and no energy is being wasted (e.g., to carry the reactive power). In alternating current power transmission and distribution, volt-ampere reactive (VAR) offers a unit of measurement for reactive power in an alternating current power system. Resistive loads (such as heaters and lights) have a power factor equal to one: making them ideal for real world electrical power consumption.

Consumers can attach loads to their respective electric grid 40, which may have mixed impedance with active and reactive components. The reactive components of the load can create the reactive power, which reduces the effectiveness of electric grid 40. Usually residential consumers are charged only for their real power (i.e., not charged for their reactive power component), while commercial and industrial consumers are charged for their apparent power consumption that includes both their real and reactive power (as measured by VAR).

Automated power factor controllers (APFC) have been developed and deployed with the goal of reducing the reactive power component to zero. APFCs are commonly installed at the boundaries between commercial and industrial consumers and electric grid 40. The APFC typically monitors the angle between the current and the voltage and, further, automatically corrects the apparent load to minimize the angle (between the current and the voltage) to zero: resulting in a power factor of 1 for a specific point in electric grid 40, which is being monitored by the APFC.

Given the high impact of the power factor on the overall electric grid efficiency, utilities measure the power factor in their substations (and in various other places of electric grid 40) and then attempt to correct the power factor by utilizing capacitor banks. This process is rather blunt, as the capacitance granularity of existing capacitor banks is coarse. Additionally, given the location where capacitor banks are deployed, they may not be able to provide compensation at the edge of electric grid 40.

Existing APFCs and capacitor banks can be configured to operate as an autonomous appliance: optimizing the apparent load of the appliances for which they provide energy. This results in a local optimization, where the reactive power is being addressed downstream, as opposed to being corrected upstream closer to the source (e.g., being corrected by electric grid management system 42). New architectures involving a smart grid can offer an opportunity to optimize the utilization of the electric power factor correction components.

Example embodiments of system 10 can offer an environment where reactive power is provided locally such that the adverse impact of reactive power on electric grid 40 is minimized. In a particular example, system 10 can facilitate collaboration amongst reactive power controllers 22a-b and neighborhood area controller 20, which can result in a global power factor optimization. Currently, APFCs operate as autonomous, isolated components and this hinders the efficiency of electric grid 40. System 10 can be configured to utilize small reactive power controllers 22a-b to provide a fine granularity for a power factor optimization, which enhances the efficiency of electric grid 40.

Additionally, system 10 can facilitate a global power factor optimization at various segments of electric grid 40. Localized compensation can be used to reduce any upstream impact of offending consumers that produce reactive power. Because the reactive power offset is done locally, the number of affected electric grid components is also reduced. Thus, system 10 can effectively increase the longevity of various electric grid components by reducing the unnecessary reactive current propagating through them. The effective capacity of electric grid 40 can also be increased by reducing unnecessary reactive current closer to its source. From a practical standpoint, system 10 can also offer financial incentives to consumers, who assist in improving the efficiency of electric grid 40, as discussed in below.

Figure 2:
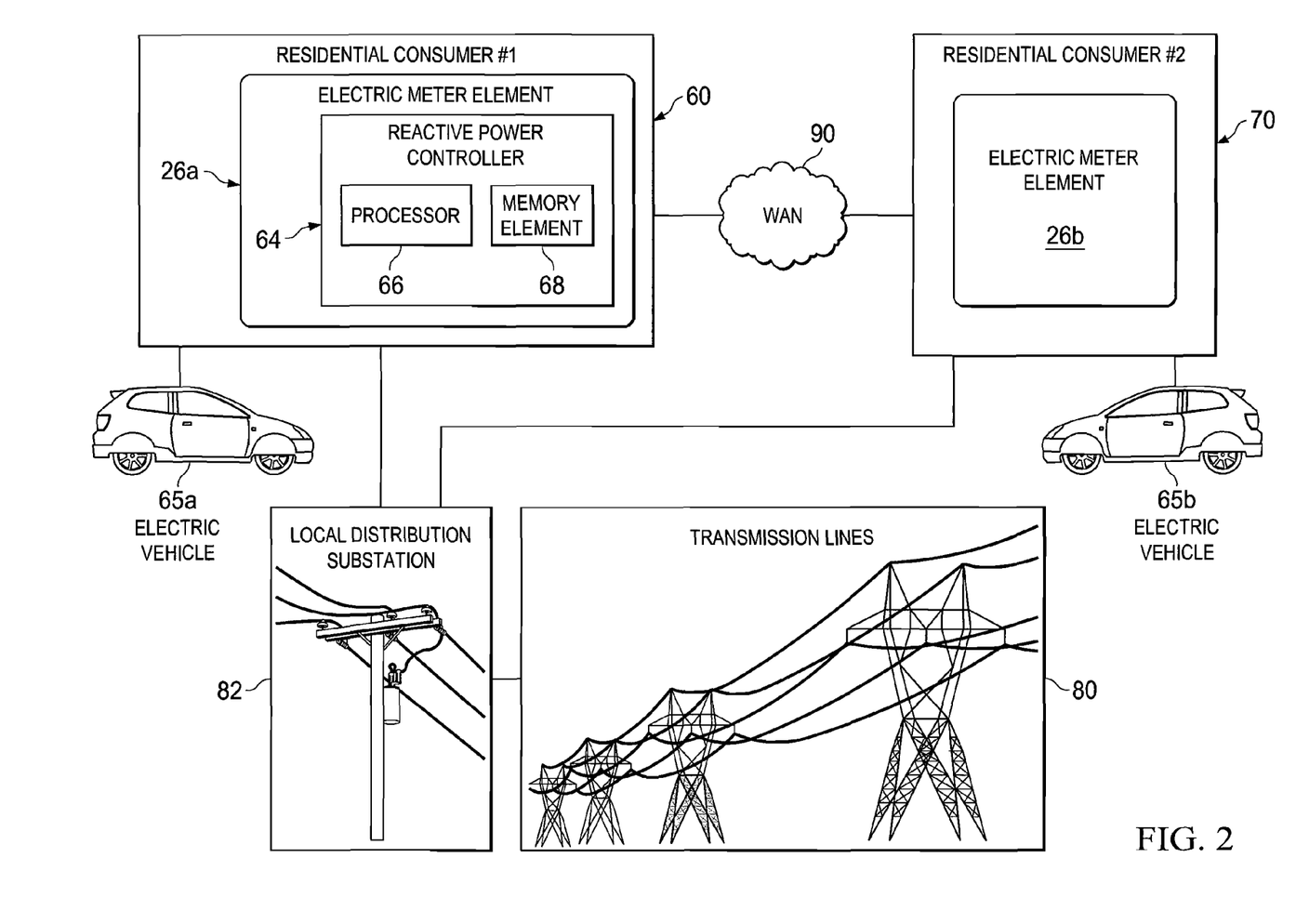
FIG. 2 is a simplified block diagram of an example scenario involving residential consumers in accordance with one embodiment of the present disclosure.

Turning to FIG. 2, FIG. 2 illustrates a simplified example scenario involving residential consumers: one of whom is creating unwanted reactive power to be compensated by his neighbor. FIG. 2 includes a residential consumer #1 60, which includes an electric meter element 26a that further includes a reactive power controller 64, a processor 66, and a memory element 68. It should be noted that the meter described in this example may be a dedicated meter that is part of an automatic power factor controller and may be different from, or the same as the utility installed power meter. This particular residential consumer #1 60 uses an electric vehicle 65a. Also provided in FIG. 2 is a residential consumer #2 70, which includes an electric meter element 26b. Residential consumer #2 70 also uses an electric vehicle 65b, as is depicted. These particular residential consumers have connections to a WAN 90 and to a local distribution substation 82, which has a connection to a set of transmission lines 80. Note that, in particular examples, electric meter element 26a may be part of a home energy controller (HEC), or electric meter element 26a may be part of a computer system (or a proprietary system) or a smart green energy system, which assists in coordinating activities related to power transmission and/or the smart grid. In this paradigm, residential consumer #1 60 (the micro-generator) can provide real power to his neighbor (residential consumer #2 70), as discussed below.

In this particular scenario, residential consumer #1 60 has intelligent power management equipment, inclusive of reactive power controller 64. In more technical terms, reactive power controller 64 can be configured to prevent residential consumer #1 60 from presenting reactive power consumption to the power network (i.e., aligning the cosine of the angle theta to be 1, such that the angle theta is 0, and reactive power is eliminated and/or minimized). In theory, residential consumer #1 60 is consuming only real power from electric grid 40. This would represent an ideal scenario for power consumption for this user.

Residential consumer #2 70 does not have a reactive power controller (nor any type of APFC) installed at his residence and, therefore, he consumes power with real and reactive components. This is not an ideal scenario for electric grid 40, as it is being presented with a component of reactive power that reduces its efficiency. Note that typically, electric grid 40 may assess this particular consumer a fee, or charge him for introducing the reactive power component into the power system. In this particular example, the reactive power emanating from residential consumer #2 70 is a kilo volt-ampere (KVA).

This reactive power component may be measured by the utility grade meter through which residential consumer #2 70 receives its power from electric grid 40, or in an upstream substation (or identified at any other suitable location). If the reactive power component is deemed to be sufficiently large, a command may be sent to a capacitor bank to attempt to correct the power factor (i.e., bring the power factor closer to 1). As described previously, given the coarse granularity of the capacitor bank and the fact that the correction is applied in the upstream substation, the efficiency of electric grid 40 is still less than optimal. Unlike the optimization offered by existing systems, system 10 is configured to measure the voltage and the current at a local transformer level and, further, intelligently offset the reactive power component created by residential consumer #2 70.

As a result of the detection of reactive power, system 10 is configured to communicate with reactive power controller 64 to request it to overcompensate and consume reactive power in an opposite polarity to the reactive power being generated by residential consumer #2 70. In this particular example, neighborhood area controller 20 is configured to issue a command (e.g., communicate a message) to reactive power controller 64. Reactive power controller 64 (of residential consumer #1 60) is requested to generate reactive power in a 180 degree phase shift (in relation to residential consumer #2 70), which nullifies the affect of the reactive power being generated by residential consumer #2 70. In this particular example, reactive power controller 64 is configured to consume one KVA to offset the reactive power being generated by residential consumer #2 70.

In one sense, residential consumer #1 60 can be viewed as a controlled micro-generator of reactive power that (at least partially) fulfils the demand for reactive power in its surroundings (e.g., in its neighborhood). Note that specific financial incentives can be offered to residential consumer #1 60 at this juncture (or as part of some type of service agreement involving residential consumer #1 60 and the provider associated with electric grid 40). Using analogous reasoning, a disincentive (e.g., a fee or a surcharge) could be provided to penalize residential consumer #2 70, as being responsible for generating unwanted reactive power.

As a result of the operations of residential consumer #1 60, the affect of the reactive power is mitigated (and/or vitiated) locally. This further minimizes the negative impact of reactive power on the overall operation of electric grid 40. Additionally, congestion on transmission and high voltage distribution lines is minimized using such a scheme. This is because the reactive power issue is being addressed at the local level, where transmission lines are not being occupied by reactive power that would otherwise be present. Hence, system 10 can be configured to utilize grid communication links to connect disparate and autonomous power controllers such that they form a comprehensive mesh of cooperating appliances.

In operation, reactive power controller 64 is configured to measure the reactive power (along with real power) within a given energy system (e.g., an electric grid, an electricity system, etc.). Reactive power controller 64 can also be configured to measure positive and negative power. These precise measurements can enable bill settlement between utilities and consumers, who can (at times) act as controlled micro-generators for electric grid 40. (Note that the terminology 'positive' and 'negative' reactive power is used to describe reactive power consumed by leading or lagging power with respect to an applied voltage.)

Reactive power controller 64 can also dynamically regulate itself to achieve zero reactive power. This target is statically configured to provide a power factor of one for the power consumed by residential consumer #1 60, but commands can be given to reactive power controller 64 such that it can offset reactive power that is prevalent in the energy system (e.g., reactive power generated by residential consumer #2 70). Hence, reactive power controller 64 has a corrective mechanism to offset, or otherwise manage, reactive power at the behest of electric grid management system 42 (or at the direction of any other suitable entity or component of system 10). In one example, reactive power controller 64 detects reactive power and autonomously provides this correction mechanism. Thus, equipment such as reactive power controller 64 can effectively zero-out the reactive power in a given segment of the electric grid system. Additionally, reactive power controller 64 can include a port or an interface for communications that indicate/specify how reactive power should be offset (i.e., specifying the exact quantity of reactive power to be generated at a certain time, involving a certain polarity, etc.). These messages can be systematically sent to reactive power controller 64, as the reactive power is detected in any given segment of electric grid 40. Any sensor at any level (e.g., transformer, local, utility, SCADA, electric grid management system 42, electric grid 40) can detect the reactive power. Such sensors could also include any of the metering elements discussed herein.

In one particular implementation, a command from a distribution substation (or from electric grid management system 42, from transformer equipment, from a utility, etc.) can indicate the amount of reactive power to be offset at a specified time of day in a specific polarity. If residential consumer #1 60 is able to provide the requested reactive power, his bill could be reduced proportionately. For example, residential consumer #2 70 may be charged 13¢/kilowatt for the reactive power he generates, while residential consumer #1 60 may be given 10¢ for every reactive KVA that he supplies to the network in the requested polarity. In this manner, the affect of the reactive power can be contained in a more localized fashion, where a more precise fine-tuning occurs (as compared to the coarse adjustment of existing capacitor banks).

As a related note, electric meter element 26a is configured to communicate with any entity responsible for billing this particular residential consumer #1 60. More precisely, electric meter element 26a needs to account for the reactive power offset that was induced by residential consumer #1 60. In this sense, electric meter element 26a is ensuring that the resident is being credited for inducing the requested reactive power, as per the agreed upon terms. Thus, electric meter element 26a is synchronizing what was being asked of residential consumer #1 60, and what was actually induced by residential consumer #1 60. In one particular example, electric meter element 26a communicates with location and time of use pricing element 34 of electric grid management system 42 in order to coordinate billing activities. Location and time of use (ToU) pricing element 34 may be part of electric grid management system 42, or be provided as its own separate component. ToU can also be inclusive of time of day (TOD) metering, seasonal time of day (SToD), etc. Metering can involve dividing the day, month, and year into tariff slots, where higher energy rates are provided at peak load periods and lower tariff rates are provided at off-peak load time intervals.

Note that in a more practical configuration, there may be two different meters/measurement devices. The APFC can have a meter that measures the phase between the voltage and the current and then adjusts the APFC (accordingly) to align this phase to zero. The APFC in the enterprise is usually owned by an owner of the facility. This stands in contrast to the billing meter configuration that is commonly owned by a utility. For purposes of simplification, a single meter configuration is depicted in FIG. 2, but system 10 is applicable to other scenarios in which two meters are prevalent (as discussed above).

Figure 3A:
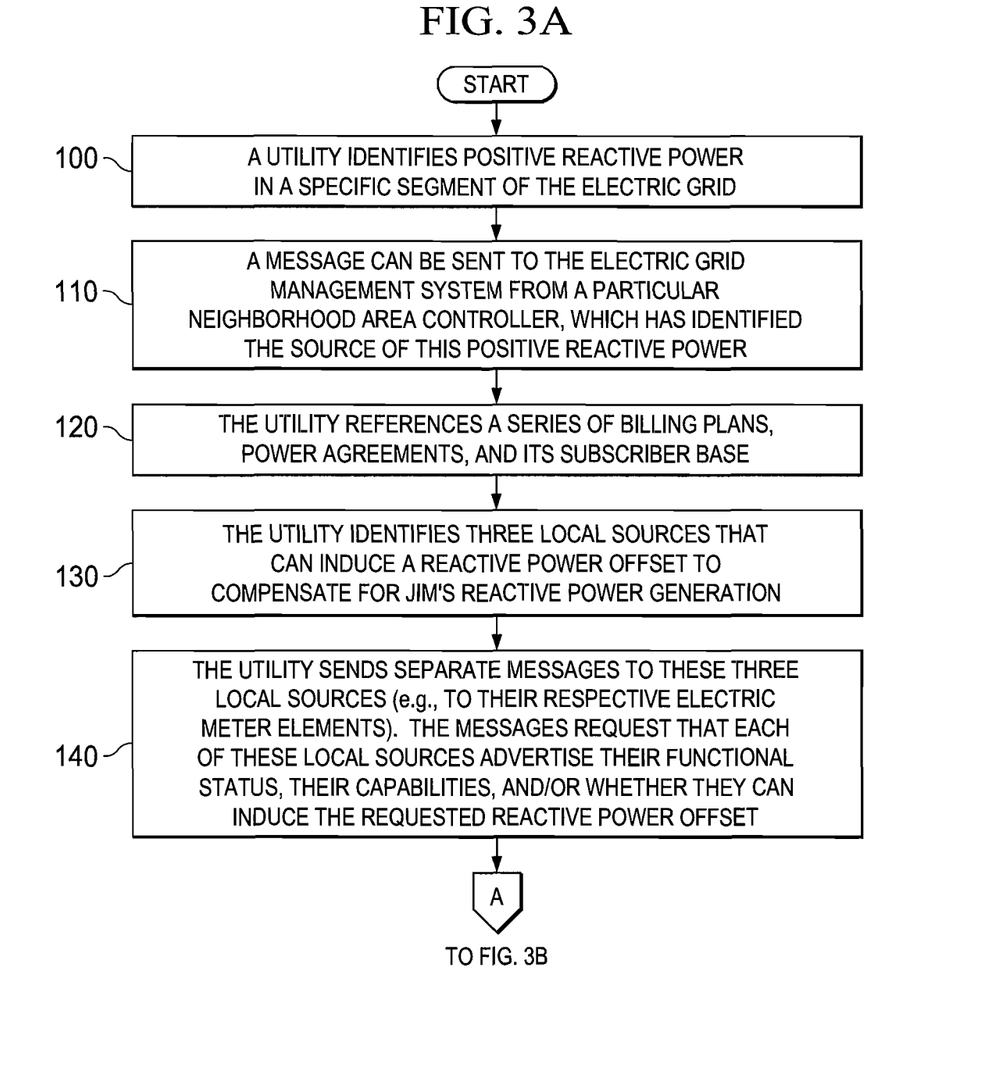
FIGS. 3A-B are simplified flowcharts illustrating an example operational flow involving the system for providing collaborating power controllers in accordance with one embodiment of the present disclosure.
Figure 3B:
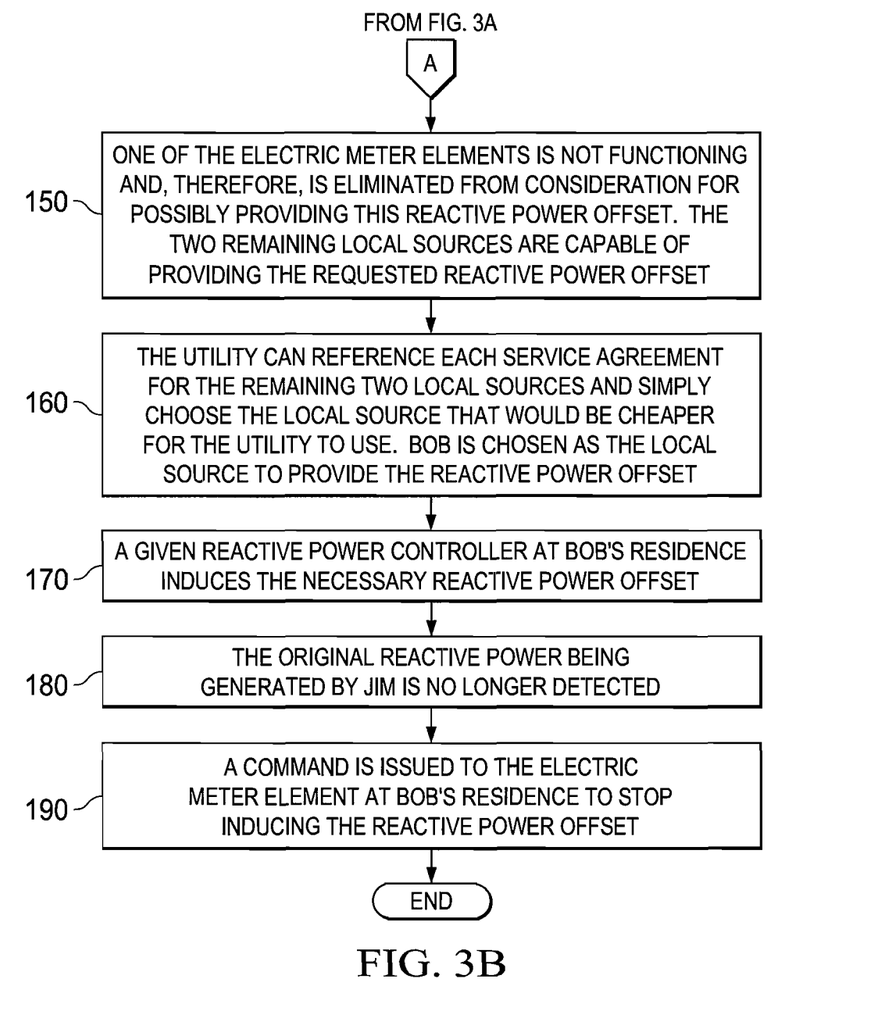

FIGS. 3A-B are simplified flowcharts illustrating example steps associated with one scenario that could be accommodated by system 10. At step 100, a given utility identifies positive reactive power in a specific segment of electric grid 40. This could have been identified, for example, at the transformer level. A specific message can be sent to electric grid management system 42 (for example) from a particular neighborhood area controller 20, which has identified the source of this positive reactive power. This is reflected by step 110, where the residential consumer (Jim) is identified as the offending party, who is generating reactive power. The associated utility references a series of billing plans, power agreements, and its subscriber base (e.g., provided in some type of electronic table, repository, etc.) at step 120. (This information could be stored in database 50 of FIG. 1, for example.) The particular table can also include the capabilities for each individual subscriber such that the utility can readily identify which type of equipment is registered to each subscriber.

At step 130, the utility identifies three local sources that can induce a reactive power offset to compensate for Jim's reactive power generation. This could involve executing any number of algorithms that can determine the closest capable source of offsetting this reactive power. At step 140, the utility sends separate messages to these three potential local sources (e.g., to their respective electric meter elements). The messages could request that each of these local sources advertise their functional status, their capabilities, and/or whether they can induce the requested reactive power offset. In this particular example, one of the electric meter elements is not functioning and, therefore, is eliminated from providing this reactive power offset.

Both of the two remaining local sources are capable of inducing the requested reactive power offset, as is depicted in step 150. To make its selection, the utility has several options. For example, the utility can reference each service agreement for the remaining two local sources and simply choose the local source that would be cheaper for the utility to use. This is depicted in step 160, where Bob is chosen as the local source. If the service agreements were identical, then the utility could reference archived activities to identify which local source recently/successfully performed this type of activity. In other scenarios, the utility could employ other algorithms that would choose the local source having a service agreement closest to expiration. Other selection mechanisms can readily be employed by the utility in designating which local source would provide the requested reactive power offset. In other embodiments, a request can be sent to a plurality of reactive power controllers (e.g., APFCs), requesting each one of them to induce only a portion of the total needed reactive power.

At step 170, a given reactive power controller at Bob's residence induces the necessary reactive power offset. At step 180, the original reactive power being generated by Jim is no longer being detected. At step 190, a command is issued to the electric meter element at Bob's residence to stop inducing the reactive power offset. The negative effects of the reactive power have been efficiently resolved at the local level, while simultaneously reducing congestion on transmission and/or distribution power lines. In a general sense, the mitigation occurred at the local level, where reactive power was efficiently canceled out by entities proximate to the offending residence. The reactive power was not improperly sent upstream to be dealt with by other components; instead, this issue was resolved at a downstream level. At the same time, Bob was rewarded for his active participation in resolving this unwanted reactive power.

As an aside, it should be noted that one significant use of system 10 can occur when consumers are sharing the same transformer winding. The reactive currents nullify each other at the transformer level without causing the transformer to heat up unnecessarily. A topology involving two consumers residing on the same transformer, but on different windings, provides a somewhat lesser benefit than the scenario in which transformer windings are shared.

Additionally, in other example implementations, capacitor banks can work in conjunction with reactive power controller 64, where both elements are coordinating their activities in an effort to reduce reactive power in electric grid 40. Stated otherwise, when the current being consumed by consumers is mixed on any segment of electric grid 40, there is still a benefit in using reactive power controller 64 of residential consumer #1 60 to reduce the reactive current introduced by residential consumer #2 70. In such an instance, the capacitor bank can provide a coarse-step correction, while the small reactive power controller 64 can provide a more granular fine-tuning of the power factor: resulting in a more efficient overall operation of electric grid 40.

It should be noted that the terminology 'power factor controller' and 'reactive power controller' are used interchangeably herein. Additionally, functions that were described as being performed by the utility can be performed by utility SCADA 52, or by distributed SCADA software, which can reside (at least partially) within neighborhood area controller 20. Alternatively, this function can be performed by a hybrid architecture that implicates utility SCADA 52 and/or the distributed control algorithms, which may be running in neighborhood area controller 20. Moreover, the term 'induce' is meant to connote any activity (e.g., generating, providing, etc.) associated with mitigating reactive power that may be present. 'Mitigating' is meant to include compensating, offsetting, balancing, etc. the reactive power on any segment of the energy system. The segment may include any distribution line, transmission line, wire, power line, power link, power channel, power device, infrastructure, or component associated with energy propagation (inclusive of energy distribution, transmission, reception, management, etc.).

Note that in certain example implementations, the reactive power coordination functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 1-2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIGS. 1-2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, neighborhood area controller 20 and/or electric meter element 26a may include software in order to achieve the reactive power offset functions outlined herein. These activities can be facilitated by reactive power controllers 22a-b, 64, which can be provided as software, or/and as hardware within their respective devices. Neighborhood area controller 20 and electric meter element 26a can include memory elements for storing information to be used in achieving the intelligent reactive power offset activities, as outlined herein. Additionally, neighborhood area controller 20 and electric meter element 26a may include a processor that can execute software or an algorithm to perform the reactive power offset activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, lookup table, cache, etc.) should be construed as being encompassed within the broad term 'memory element.' Similarly, any of the potential processing elements, modules, and machines described in this Specification should be construed as being encompassed within the broad term 'processor.' Each of reactive power controllers 22a-b, 64, and electric meter element 26a can also include suitable interfaces for receiving, transmitting, and/or otherwise communicating data or information in a network environment.

Note that with the example provided above, as well as numerous other examples provided herein, interaction may be described in terms of two, three, or four elements. Similarly, functions that were described by a single element (such as a single electric meter) may be provided by multiple similar elements (such as multiple similar electric meters and metrology devices). However, this has been done for purposes of clarity and example only. In certain cases, it may be easier to describe one or more of the functionalities of a given set of flows by only referencing a limited number of elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular exchanges involving components of electric grid management system 42, system 10 may be applicable to other types of energy systems and arrangements such as any type of electricity network or, more generally, a power environment in which reactive power is present. For example, system 10 can be applicable to other reactive power environments, such as those encountered in charging stations, large-scale energy storage, power line communications, the smart grid, the SuperSmart Grid, the Super grid, the Unified Smart Grid (USA), a Vehicle-to-grid architecture, etc. In such energy systems, a reactive power controller (such as those discussed herein) can be used to intelligently offset reactive power that is present in any environment.

In addition, WAN 16 can be replaced by any IP network, local area network (LAN), wireless local area network (WLAN), metropolitan area network (MAN), Intranet, Extranet, wide area network (WAN), virtual private network (VPN), or any other appropriate architecture or system that facilitates communications in a network environment. System 10 can be implemented using any standard or proprietary protocols, and the data can be transferred over a dedicated wire network, via wireless, radio, or using the power lines themselves via power line communications (PLC), broadband over power line (BPL) communication links, etc. Moreover, the present disclosure is equally applicable to various green technologies in which reactive power may be present. Moreover, although system 10 has been illustrated with reference to particular elements and operations that facilitate the communication process, these elements and operations may be replaced by any suitable architecture or process that achieves the intended functionality of system 10.

What is claimed is:

1. A method, comprising:
   detecting a quantity of reactive power on a specific segment of an energy system;
   selecting one network element from a plurality of network elements connected to the specific segment of the energy system and capable of producing reactive power, wherein the selecting is based on at least one of a billing plan associated with each of the network elements, a power agreement associated with each of the network elements, a subscriber base of the specific segment of the energy system, and the functional status and capabilities of each of the network elements;
   sending a message associated with the detection to the selected network element, the message specifying a power level of the detected reactive power; wherein subsequent to receipt of the message, the selected network element induces a first quantity of reactive power at the power level specified in the message, wherein the first quantity of reactive power is induced in order to mitigate a second quantity of reactive power detected on the specific segment of the energy system, and wherein the first quantity of reactive power is induced at a local level on which a source associated with the second quantity of reactive power operates; and
   generating a bill for a particular time interval, wherein the bill is based on compliance with the message by inducing the first quantity of reactive power by the selected network element.

2. The method of claim 1, wherein the message is sent in response to a sensor of the energy system detecting the second quantity of reactive power, and wherein the first quantity of reactive power and the second quantity of reactive power are the same.

3. The method of claim 1, further comprising:
   receiving a second message to stop mitigating the first quantity of reactive power, wherein the second message is sent in response to detecting that the second quantity of reactive power is no longer present on the specific segment of the energy system.

4. The method of claim 1, further comprising:
   providing a financial benefit to an owner associated with activities inducing the first quantity of reactive power, wherein the financial benefit is provided in response to complying with the message to induce the first quantity of reactive power.

5. The method of claim 1, wherein the first quantity of reactive power compensates for the second quantity of reactive power on the specific segment of the energy system to bring an associated power factor closer to one.

6. The method of claim 1, wherein the message includes a specific time interval in which the first quantity of reactive power is consumed, and wherein the message includes a specific polarity associated with the first quantity of reactive power to be consumed.

7. The method of claim 1, wherein the first quantity of reactive power is phase shifted 180° in relation to the second quantity of reactive power.

8. Logic encoded in one or more tangible non-transitory media that includes code for execution and when executed by a processor operable to perform operations comprising:
   detecting a quantity of reactive power on a specific segment of an energy system;
   selecting one network element from a plurality of network elements connected to the specific segment of the energy system and capable of producing reactive power, wherein the selecting is based on at least one of a billing plan associated with each of the network elements, a power agreement associated with each of the network elements, a subscriber base of the specific segment of the energy system, and the functional status and capabilities of each of the network elements;
   sending a message associated with the detection to the selected network element, the message specifying a power level of the detected reactive power; wherein subsequent to receipt of the message, the selected network element induces a first quantity of reactive power at the power level specified in the message, wherein the first quantity of reactive power is induced in order to mitigate a second quantity of reactive power detected on the specific segment of the energy system, and wherein the first quantity of reactive power is induced at a local level on which a source associated with the second quantity of reactive power operates; and
   generating a bill for a particular time interval, wherein the bill is based on compliance with the message by inducing the first quantity of reactive power by the selected network element.

9. The logic of claim 8, wherein the message is sent in response to a sensor of the energy system detecting the second quantity of reactive power, and wherein the first quantity of reactive power and the second quantity of reactive power are the same.

10. The logic of claim 8, wherein the operations further comprises:
    receiving a second message to stop mitigating the first quantity of reactive power, wherein the second message is sent in response to detecting that the second quantity of reactive power is no longer present on the specific segment of the energy system.

11. The logic of claim 8, wherein a financial benefit is provided to an owner associated with activities inducing the first quantity of reactive power, and wherein the financial benefit is provided in response to complying with the message to induce the first quantity of reactive power.

12. The logic of claim 8, wherein the first quantity of reactive power compensates for the second quantity of reactive power on the specific segment of the energy system to bring an associated power factor closer to one.

13. The logic of claim 8, wherein the first quantity of reactive power is phase shifted 180° in relation to the second quantity of reactive power.

14. An apparatus, comprising:
    a memory element configured to store electronic code;
    a processor operable to execute instructions associated with the electronic code; and
    a management system configured to interface with the processor and further configured to:
       detect a quantity of reactive power on a specific segment of an energy system;
       select one network element from a plurality of network elements connected to the specific segment of the energy system and capable of producing reactive power, wherein the selecting is based on at least one of a billing plan associated with each of the network elements, a power agreement associated with each of the network elements, a subscriber base of the specific segment of the energy system, and the functional status and capabilities of each of the network elements;
       send a message associated with the detection to the selected network element, the message specifying a power level of the detected reactive power; wherein subsequent to receipt of the message, the selected network element induces a first quantity of reactive power at the power level specified in the message, wherein the first quantity of reactive power is induced in order to mitigate a second quantity of reactive power detected on the specific segment of the energy, and wherein the first quantity of reactive power is induced at a local level on which a source associated with the second quantity of reactive power operates; and generate a bill for a particular time interval, wherein the bill is based on compliance with the message by inducing the first quantity of reactive power by the selected network element.

15. The apparatus of claim 14, further comprising:
a neighborhood area controller configured to communicate the message, wherein the message is sent in response to a sensor of the energy system detecting the second quantity of reactive power, and wherein the first quantity of reactive power and the second quantity of reactive power are the same.

16. The apparatus of claim 14, wherein a second message is received to stop mitigating the first quantity of reactive power, and wherein the second message is sent in response to detecting that the second quantity of reactive power is no longer present on the specific segment of the energy system.

17. The apparatus of claim 14, wherein a financial benefit is provided to an owner associated with activities inducing the first quantity of reactive power, and wherein the financial benefit is provided in response to complying with the message to induce the first quantity of reactive power.

18. The apparatus of claim 14, wherein the first quantity of reactive power compensates for the second quantity of reactive power on the specific segment of the energy system to bring an associated power factor closer to one.

19. The apparatus of claim 14, wherein the message includes a specific time interval in which the first quantity of reactive power is consumed, and wherein the message includes a specific polarity associated with the first quantity of reactive power to be consumed.

20. The apparatus of claim 14, wherein the first quantity of reactive power is phase shifted 180° in relation to the second quantity of reactive power.

* * * * *